UNITED STATES PATENT OFFICE 2,149,494

WATER-INSOLUBLE AZO DYESTUFFS

Fritz Ballauf, Cologne-Muhlheim, Germany, assignor to General Aniline Works, Inc., New York, N. Y., a corporation of Delaware No Drawing. Application May 29, 1936, Serial No. 82,673. In Germany June 8, 1935

8 Claims. (Cl. 260—157)

The present invention relates to water-insoluble azo dyestuffs and the fibers dyed therewith, more particularly it relates to water-insoluble azo dyestuffs which may be represented by the probable general formula:

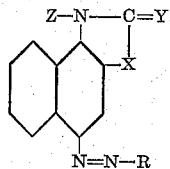

In the said formula X stands for an oxygen atom or the imino group in which the hydrogen atom may be substituted by a hydrocarbon radical, Y stands for an oxygen or sulfur atom, Z stands for a hydrogen atom or an alkyl group, R stands for the radical of an ice color coupling component, and wherein the naphthalene nucleus may bear substituents which do not cause solubility in water or aqueous alkalies.

My new dyestuffs are obtainable by coupling in substance or on a substratum, especially the vegetable fiber, an ice color coupling component with the diazo compound of an amine of the general formula:

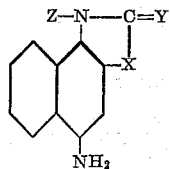

wherein X, Y and Z mean the same as stated above.

The dyestuffs thus obtained on the fiber generally yield deep shades of particularly good fastness to light.

The amines of the above constitution may be obtained, for example, by treating a 1,2-naphthylenediamine or 1-amino-2-hydroxy-naphthalene with phosgene or carbon disulfide, nitrating the condensation products thus obtained and reducing the nitro group.

The invention is illustrated by the following examples but is not restricted thereto.

Example 1

50 grams of cotton yarn are grounded for half an hour at 30° C. in 1 liter of an aqueous solution alkaline with sodium carbonate prepared in the usual manner from 1.5 grams of 2',3'-hydroxynaphthoyl - 2 - amino-naphthalene. Thereupon the yarn is centrifuged and developed for half an hour in 1 liter of a 40° C. diazo bath prepared according to the usual method by diazotizing 2.6 grams of the following amine:

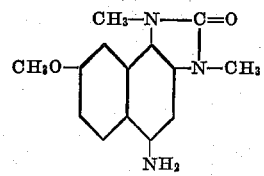

and neutralizing with zinc oxide. Advantageously 4.3 grams of zinc sulfate are added to the diazo bath. Thereupon the dyed material is rinsed and dried. A dark blue coloration is thus obtained of very good fastness properties. The dyestuff corresponds to the following formula:

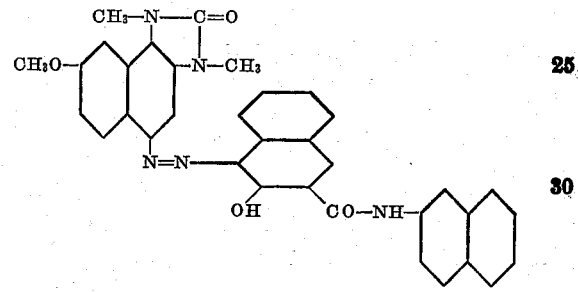

The amine of the formula:

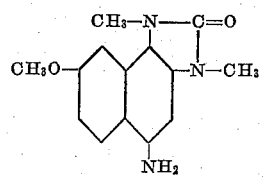

can be easily prepared in the following manner:

2.7-aminonaphthol is coupled in acid medium with diazotized aniline. The dyestuff obtained is reduced in dilute acetic acid by means of zincdust. The amine can be isolated as sulfate. The amine is treated in alcohol with phosgene and the 7-hydroxy-1.2-naphthylenediamine-urea is obtained, which can be trimethylated with dimethylsulfate. The product thus obtained crystallizes from toluene in needles of the melting point 177° C.

Nitration in the usual manner in glacial acetic acid yields a yellow nitro-compound of the melting point 255° C., which can be reduced in alcohol with zinc-dust and glacial acetic acid. The hydrochloride of the reduction product is colorless and can easily be diazotized. By substituting carbon disulfide for the phosgene, the corresponding 7 - hydroxy - 1.2 - naphthylenediamine-thiourea is obtained.

*Example 2*

A cotton piece material is grounded in the usual manner by a short passage through a solution containing per liter 18 grams of 2', 3'-hydroxynaphthoyl - 1 - amino-2-methyl-4-methoxy-benzene, squeezed off and dried. Thereupon it is introduced into a diazo solution obtainable in the usual manner from 18 grams of an amine of the following formula:

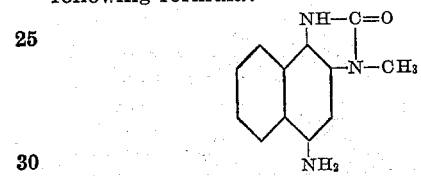

Subsequently the material is passed either through hot water of about 70–90° C. or through a quick steam cooker, rinsed, acidified, again rinsed and after-treated in a boiling soap bath. A navy blue of excellent fastness properties, especially to light is thus obtained. The dyestuff corresponds to the following formula:

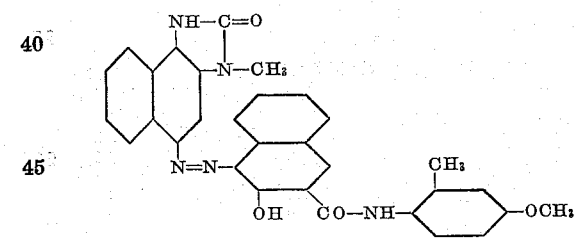

The amine of the formula:

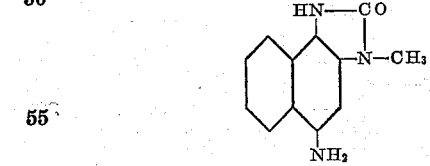

used above may be prepared as follows:

β-methylnaphthylamine is coupled in acid medium with diazotized aniline and the obtained dyestuff is reduced in dilute acetic acid with zinc-dust. The 2-methylamino-α-naphthylamine is an oil, which boils at 230° C./35 mm. When treated with phosgene in alcohol, the inner urea is obtained, which can be recrystallized in long needles from glacial acetic acid and which melts at 296° C. This compound is nitrated in glacial acetic acid. The nitration product is yellow and melts above 300° C. By reduction the amine is obtained, which in the form of the hydrochloride can be recrystallized from water. As noted above in Example 1, the corresponding thiourea can be obtained by substituting the carbon disulfide for phosgene.

In an analogous manner there are obtained on applying one of the methods described in the preceding examples by a combination of:

2',3'-hydroxynaphthoylaniline with

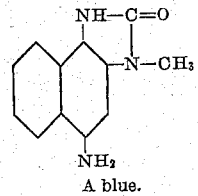

A blue.

2',3'-hydroxynaphthoyl-1-amino-2-methylbenzene with

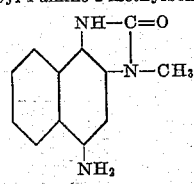

A navy blue.

2',3'-hydroxynaphthoyl-1-amino-4-methoxybenzene with

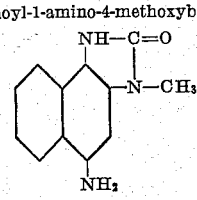

A blue.

2-hydroxyanthracene-3-carboxylic acid-2'-toluidide with

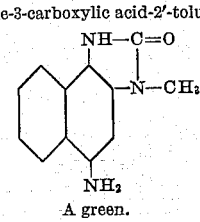

A green.

2',3'-hydroxynaphthoyl-1-amino-2,5-dimethoxybenzene with

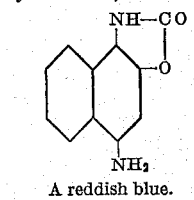

A reddish blue.

2',3'-hydroxynaphthoyl-1-aminonaphthalene with

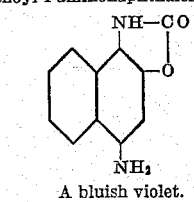

A bluish violet.

2',3'-hydroxynaphthoyl-aniline with

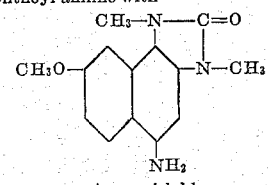

A greenish blue.

2',3'-hydroxynaphthoyl-1-amino-naphthalene with

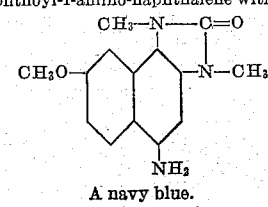

A navy blue.

2′,3′-hydroxynaphthoyl-1-amino-2,4-dimethylbenzene with

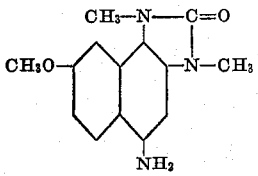

A reddish blue.

2′,3′-hydroxynaphthoyl-1-amino-2-methyl-4-chlorobenzene with

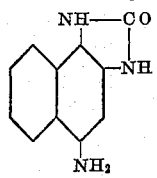

A reddish blue.

2′,3′-hydroxynaphthoyl-1-amino-2-methoxy-5-chlorobenzene with

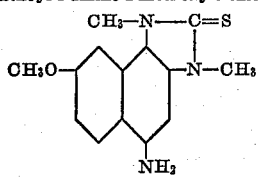

A greenish blue.

2′,3′-hydroxynaphthoyl-1-amino-2-methyl-4-methoxybenzene with

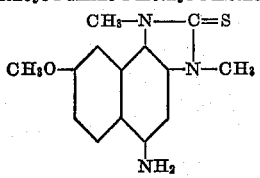

A reddish blue.

7′,8′-benzo-2′,3′-hydroxycarbazoyl-1-amino-2-methyl-4-methoxybenzene with

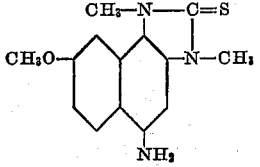

A dark blue.

The amine of the formula:

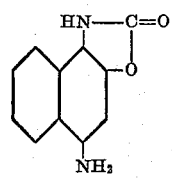

which is used in the fifth and sixth combinations in the above table may be prepared by treating 1.2-aminonaphthol with phosgene. The product thus formed is nitrated in glacial acetic acid and then reduced to the amine.

I claim:

1. Water-insoluble azo dyestuffs selected from the group of compounds consisting of dyestuffs of the formula:

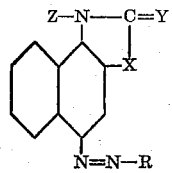

wherein X stands for a member selected from the group consisting of oxygen, the imino group and an imino group in which the hydrogen atom is substituted by a hydrocarbon radical, Y stands for a member selected from the group consisting of oxygen and sulfur, Z stands for a member selected from the group consisting of hydrogen and a saturated lower alkyl hydrocarbon, R stands for the radical of an ice color coupling component selected from the group consisting of arylamides of 2.3-hydroxynaphthoic acid, 2-hydroxyanthracene-3-carboxylic acid and o-hydroxybenzocarbazole-carboxylic acid, and such dyestuffs substituted in the naphthalene nucleus by substituents which do not cause solubility in water and aqueous alkalies, yielding, when produced on the fiber, in general shades of good fastness to light.

2. The water-insoluble azodyestuff of the formula:

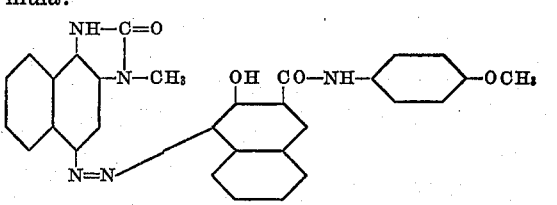

yielding, when produced on the fiber blue shades of good fastness properties.

3. The water-insoluble azodyestuff of the formula:

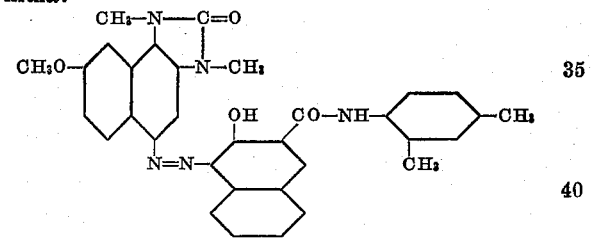

yielding, when produced on the fiber reddish blue shades of good fastness properties.

4. Fiber dyed with a dyestuff as claimed in claim 1.

5. Fiber dyed with a dyestuff as claimed in claim 2.

6. Fiber dyed with a dyestuff as claimed in claim 3.

7. Water-insoluble azodyestuffs of the general formula:

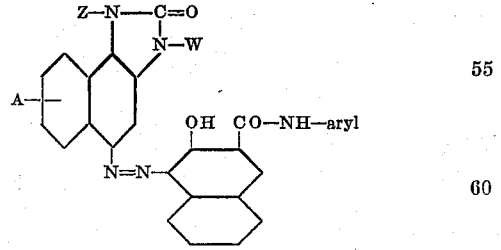

wherein W and Z stand for a member of the group consisting of hydrogen and a saturated lower alkyl hydrocarbon, and A stands for a member of the group consisting of hydrogen and alkoxy, yielding when produced on the fiber in general shades of good fastness to light.

8. Fiber dyed with a dyestuff as claimed in claim 7.

FRITZ BALLAUF.